United States Patent [19]

Herminghaus et al.

[11] 3,987,592
[45] Oct. 26, 1976

[54] TARPAULIN WITH EDGE REINFORCING STRIP

[75] Inventors: Hellmut Herminghaus; Dieter Jablonka, both of Herdecke, Germany

[73] Assignee: Ewald Dörken AG, Herdecke, Germany

[22] Filed: Oct. 30, 1974

[21] Appl. No.: 519,197

[30] Foreign Application Priority Data
Nov. 9, 1973 Germany............................ 2356028

[52] U.S. Cl. .................................... 52/3; 135/5 R; 135/15 R; 160/380
[51] Int. Cl.² .......................................... E04B 1/00
[58] Field of Search .................... 52/3, 4; 135/5, 15; 160/371, 380, 404, 354; 281/15, 20–37; 402/79; 156/250, 252, 256, 261; 428/45, 81, 99, 138, 192

[56] References Cited
UNITED STATES PATENTS

| | | | |
|---|---|---|---|
| 189,757 | 4/1877 | Lemman............................ | 160/380 |
| 1,769,177 | 7/1930 | Conley............................... | 160/380 |
| 2,061,675 | 11/1936 | Schade................................ | 402/79 |
| 2,116,260 | 5/1938 | Corkran............................. | 160/354 |
| 2,877,876 | 3/1959 | Musselman...................... | 160/380 X |
| 3,332,473 | 7/1967 | Frederickson et al.......... | 160/404 X |

*Primary Examiner*—J. Karl Bell
*Attorney, Agent, or Firm*—Spencer & Kaye

[57] ABSTRACT

A tarpaulin composed of a sheet and edge reinforcing strips attached to the sheet along the edges thereof, only the strips being provided with perforations, at the intended locations of holding eyes, and the sheet being free of perforations so that the perforations in the strips present blind holes, whereby, for use, the sheet can be punched through only at the locations where holding eyes are required while the remaining edge portions of the sheet are left unperforated and thus unweakened.

8 Claims, 6 Drawing Figures

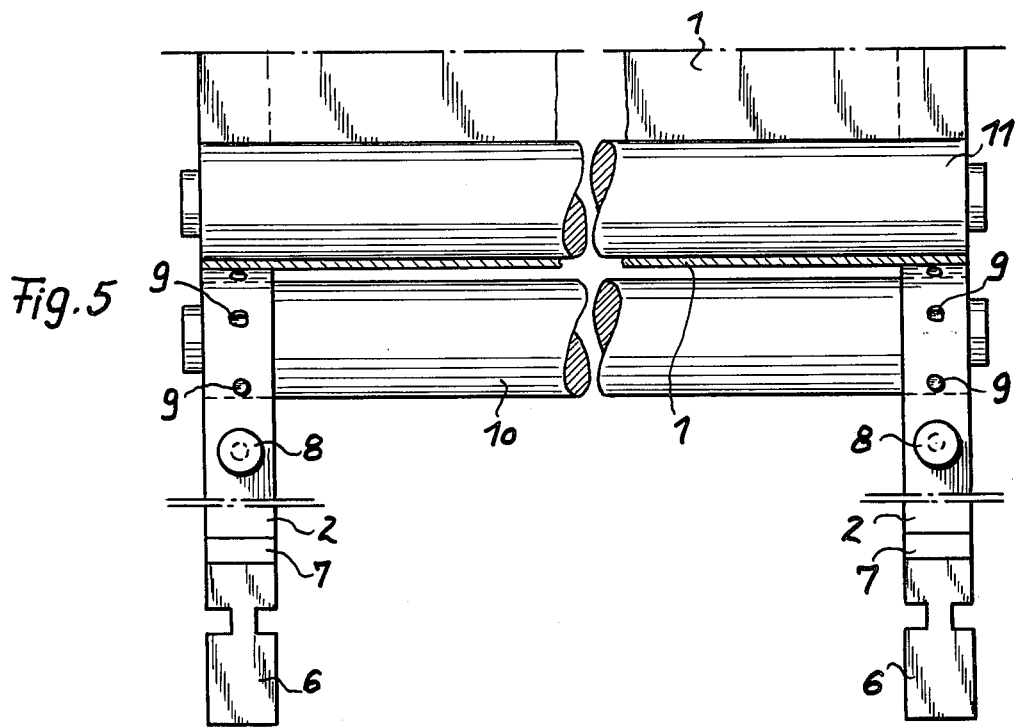
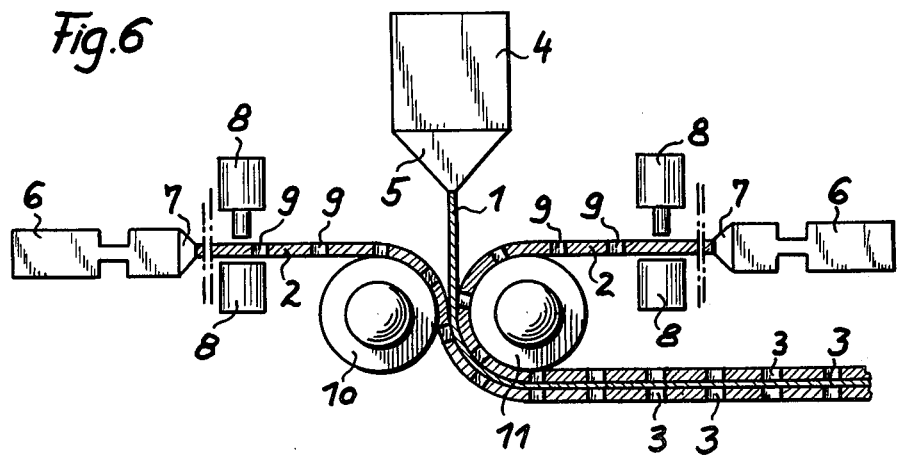

TARPAULIN WITH EDGE REINFORCING STRIP

BACKGROUND OF THE INVENTION

The present invention relates to a tarpaulin made of fabric, plastic-coated woven fabric or fleece, or of unreinforced or reinforced plastic foil with edge reinforcing strips.

Tarpaulins are used as covers for protecting all types of materials against the influences of weather, cold, heat and dust.

They are used, as fabricated, merely for covering purposes. They can also be made in a shaped form, i.e. after being cut to a pattern, provided with an edge reinforcement, eyes and other holding devices, for use as covers on trucks, protective covers on construction jobs, on railroads and for mail traffic, as well as for many other purposes. Tarpaulins which are provided with eyes, supporting strips or other fastening means have become very important in the construction industry where they serve, inter alia, as a protection against the weather, particularly during rainy and cold days.

In this connection it is known to arrange the eyes at the edge of the tarpaulin at appropriate intervals and to reinforce the edges of the eyes with metal or plastic.

In order to improve the resistance to tearing of the material around the eyes, it is known to reinforce the edge portions of the tarpaulin by folding these portions over once or several times and placing the eyes in the thus reinforced edge portion.

It is also known to form the edge reinforcements by means of prefabricated strips of plastic, to fasten them to the edge of the tarpaulin by weld seams and to then perforate the thus reinforced tarpaulin edge.

All the above-mentioned ways of applying the eyes have, of course, the drawback, either that the eyes must be attached during fabrication in the appropriate spacing required by the particular order, or the eyes are attached at uniform distances without consideration of special individual requirements, sometimes at points where they are not required at all. This creates the further drawback that the tarpaulin is consequently perforated at points where it would not seem to be desired.

SUMMARY OF THE INVENTION

It is an object of the present invention to eliminate these drawbacks in a tarpaulin of the above-described type and to simplify its manufacture.

This is accomplished, according to the present invention, by providing perforations only in the edge reinforcing strips so that the tarpaulin together with the edge reinforcing strips form blind holes in the area of the perforations, so that the tarpaulin material can be punched through, if required, to form holding eyes.

This has the advantage that the number and/or placement of edge reinforced holding eyes can be selected by the user himself, it being advantageous to keep the spaces between the blind holes as small as possible.

In this connection it is particularly advantageous for the spacing between two adjacent blind holes to correspond to approximately five times the diameter of a blind hole so that a plurality of variations are possible in the number and/or arrangement of the holding eyes without excessively weakening the edge reinforcement.

The edge reinforcing strip in this case may be made of the same type of material as the tarpaulin.

It may be advantageous under certain circumstances to make the edge reinforcing strips in a known manner of a material different from that of the tarpaulin.

For further increasing the tear resistance, the edge reinforcing strips may also be made of a material which is reinforced by inserts, such as, for example, widemeshed nets of plastic fibers, and may preferably be disposed on both sides of the tarpaulin. In a further embodiment in which the tear-resistance of the tarpaulin edge is increased, the edge reinforcing strips are permanently connected to the tarpaulin over their entire surfaces.

In one embodiment, which substantially accelerates the manufacture of the tarpaulins, a plurality of tarpaulins are connected together, their edges being defined by two juxtaposed, transverse, perforated reinforcing strips.

This makes it possible to produce a plurality of tarpaulins in a series in one contiguous strip and to then separate the individual tarpaulins between the previously attached transverse perforated reinforcing strips.

According to a particularly economical method for producing the above-described tarpaulins with reinforcing strips, where the tarpaulins are made by extrusion molding of a molten plastic mass through a fishtail die, the edge reinforcing strips are made in the same manner as the tarpaulin, are then perforated and then brought past the nozzle from which the tarpaulins are being extruded where they are pressed against the tarpaulins as soon as the latter are formed.

BRIEF DESCRIPTION OF THE DRAWINGS

Various embodiments of the present invention are illustrated in the drawings and will be described in detail below:

FIG. 5 is a top plan view taken along the line V—V of FIG. 4.

FIG. 6 is a cross-sectional view of a further apparatus for producing another embodiment of the tarpaulin according to the present invention.

DESCRIPTION OF THE PREFERRED EMBODIMENTS

Figure 1:
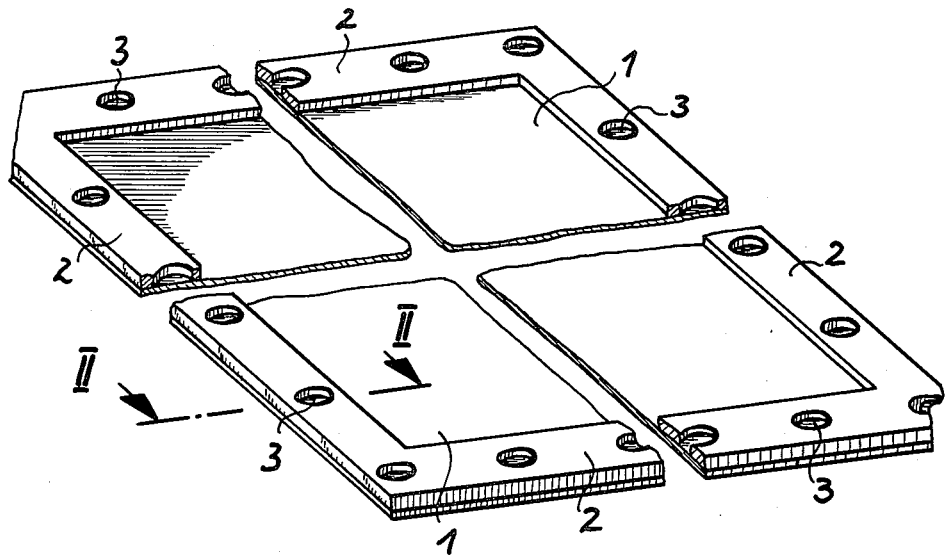
FIG. 1 is a perspective view of a tarpaulin according to the invention.
Figure 2:
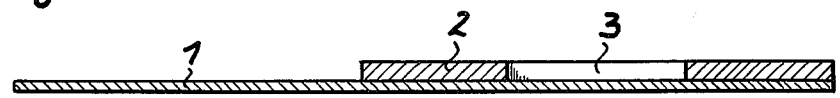
FIG. 2 is a cross-sectional view of the tarpaulin of FIG. 1, taken along the line II—II of FIG. 1.

The tarpaulin 1 shown in FIGS. 1 and 2 is provided with an edge reinforcing strip 2 which is fastened to the tarpaulin along all sides after having been perforated so that after fastening to the tarpaulin 1 the strip 2 forms blind holes 3 with the tarpaulin 1 which can be punched through as desired to provide holding eyes.

When the tarpaulin is made of plastic or plastic-coated materials, the edge reinforcing strips 2 of the same type of material are welded to the tarpaulin, with the entire surface of each strip being welded to the tarpaulin surface.

For tarpaulins and/or edge reinforcing strips 2 of non-weldable material, the edge reinforcing strips may be glued to the tarpaulin. Under certain circumstances it may suffice to sew the edge reinforcing strips 2 to the tarpaulin.

Figure 3:
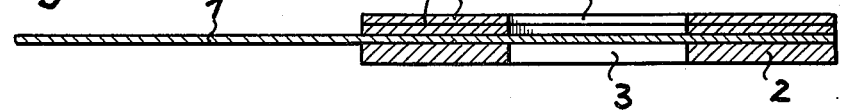
FIG. 3 is a view similar to that of FIG. 2 of a further embodiment of the invention.

In the embodiment shown in part in FIG. 3, perforated edge strips 2 are fastened to both sides of the tarpaulin 1 so that opposed pairs of blind holes 3 are formed with each hole of a pair on a respective opposite side of the tarpaulin. One or both of strips 2 may be reinforced by an insert 2'.

Figure 4:
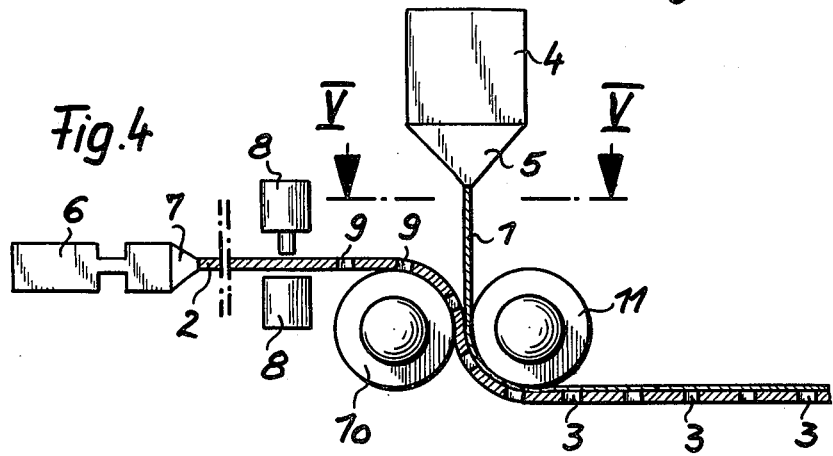
FIG. 4 is a cross-sectional view of an apparatus for producing one embodiment of a tarpaulin made according to the present invention.

Apparatus for producing the plastic tarpaulins according to the present invention, as shown in FIGS. 4 and 5, includes an extruder 4 for melting and conveying a plastic mass through a fishtail die 5 whose length corresponds to the width of the tarpaulin 1 to be extruded.

Two miniature extruders 6 are further provided with fishtail dies 7 for extruding two respective edge reinforcing strips 2. A stamp 8 is associated with each of the extruders 6 and forms through holes 9 at regular intervals along the length of its respective edge reinforcing strip 2. The tarpaulin 1 as well as the edge reinforcing strips 2 are then passed between two rotating rollers 10 and 11 so that the edge reinforcing strips 2 are continuously pressed to the still moldable tarpaulin 1 while it is being extruded and are thus permanently connected with the tarpaulin 1 without requiring any additional connecting means.

The apparatus shown in FIG. 6 can be used in the manner described above to provide edge reinforcing strips 2 on both sides of the tarpaulin 1.

At least one of the rollers 10, 11 is driven by a motor and both rollers are rotatably mounted in the machine frame.

As can be seen in FIGS. 2, 3, 4 and 6, the edge reinforcing strips 2 are thicker than the tarpaulin 1. The width of an edge reinforcing strip 2 preferably corresponds to three to four times the diameter of a blind hole 3.

It is advantageous that the process of extrusion is conducted in accordance with the process shown in the German Patent No. 831,311, priority 23.3.49 U.S.A.

It will be understood that the above description of the present invention is susceptible to various modifications, changes and adaptations, and the same are intended to be comprehended within the meaning and range of equivalents of the appended claims.

We claim:

1. In a tarpaulin composed of a flexible sheet provided with flexible edge reinforcing strips fastened to the sheet along the entire periphery thereof, the improvement wherein the strips are provided with perforations along each edge of said sheet and said sheet is free of perforations so that said edge reinforcing strips form, with said sheet, blind holes in the area of the perforations, the blind holes being adapted to be punched through as required to form holding eyes.

2. Tarpaulin as defined in claim 1 wherein the spacing of the blind holes from one another along each said strip corresponds to about five times the diameter of one blind hole.

3. Tarpaulin as defined in claim 1 wherein said edge reinforcing strips are of the same type of material as said sheet.

4. Tarpaulin as defined in claim 1 wherein said edge reinforcing strips are of a material of a different type from that of said sheet.

5. Tarpaulin as defined in claim 1 wherein said edge reinforcing strips are of a material which is reinforced by inserts.

6. Tarpaulin as defined in claim 1 wherein said edge reinforcing strips are disposed on both sides of said sheet.

7. Tarpaulin as defined in claim 1 wherein said edge reinforcing strips are permanently connected, over their entire surfaces, to said sheet.

8. A plurality of tarpaulins, each as defined in claim 1, connected together, with adjacent tarpaulins being joined by a member defining two juxtaposed, transverse, reinforcing strips, each associated with a respective tarpaulin, said member being perforated along a line defining the boundary between said tarpaulins.

* * * * *